US006810503B1

(12) United States Patent
David et al.

(10) Patent No.: US 6,810,503 B1
(45) Date of Patent: Oct. 26, 2004

(54) METHOD AND APPARATUS FOR CONTROLLING THE TIMING OF THE INVOCATION OF EVENTS WITHIN A COMPUTER RUNTIME ENVIRONMENT

(75) Inventors: Paul Christian David, Redmond, WA (US); Michael Irvin Hyman, Seattle, WA (US); Evan Gomer Kichline, Kirkland, WA (US); Phani Kumar Vaddadi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 09/021,727

(22) Filed: Feb. 11, 1998

(51) Int. Cl.[7] ............................................. G06F 15/00
(52) U.S. Cl. .............................. 715/500.1; 715/501.1; 718/100; 718/102; 345/723
(58) Field of Search ................................ 345/302, 328, 345/333, 723; 707/513, 501; 709/310, 100, 102, 328; 715/501.1, 500.1; 718/100, 102

(56) References Cited

U.S. PATENT DOCUMENTS

| 4,710,885 A | | 12/1987 | Litteken ..................... 707/513 |
| 5,414,644 A | * | 5/1995 | Seaman et al. ............. 345/302 |
| 5,530,859 A | * | 6/1996 | Tobias, II et al. ......... 395/559 |
| 5,542,000 A | * | 7/1996 | Semba ........................ 381/61 |
| 5,623,656 A | * | 4/1997 | Lyons ......................... 707/10 |
| 5,659,793 A | * | 8/1997 | Escobar et al. ............. 345/302 |
| 5,737,531 A | * | 4/1998 | Ehley ......................... 709/208 |
| 5,764,241 A | * | 6/1998 | Elliott et al. ................ 707/501 |
| 5,765,006 A | | 6/1998 | Motoyama .................. 707/514 |
| 5,768,505 A | * | 6/1998 | Gilchrist et al. ....... 395/200.31 |
| 5,777,612 A | * | 7/1998 | Kataoka ...................... 345/302 |
| 5,815,689 A | * | 9/1998 | Shaw et al. ................. 713/400 |
| 5,822,543 A | * | 10/1998 | Dunn et al. ................. 709/224 |
| 5,845,075 A | | 12/1998 | Uhler et al. .................. 707/10 |
| 5,862,327 A | * | 1/1999 | Kwang et al. .......... 395/200.33 |
| 5,889,950 A | * | 3/1999 | Kuzma ................... 395/200.48 |
| 5,892,507 A | * | 4/1999 | Moorby et al. ............. 345/302 |
| 5,953,005 A | * | 9/1999 | Liu ............................. 345/302 |
| 5,973,696 A | | 10/1999 | Agranat et al. ............. 707/501 |
| 5,978,830 A | * | 11/1999 | Nakaya et al. .............. 718/102 |
| 5,983,140 A | * | 11/1999 | Smith et al. .................. 607/59 |
| 5,987,523 A | * | 11/1999 | Hind et al. .................. 709/245 |
| 6,014,702 A | * | 1/2000 | King et al. ................. 709/227 |
| 6,018,343 A | * | 1/2000 | Wang et al. ................ 345/733 |
| 6,061,471 A | * | 5/2000 | Coleman, Jr. |
| 6,182,276 B1 | * | 1/2001 | Brawn et al. ............... 717/109 |
| 6,222,530 B1 | * | 4/2001 | Sequeira .................. 715/500.1 |
| RE37,418 E | * | 10/2001 | Tindell et al. ........... 715/500.1 |
| 6,493,739 B1 | * | 12/2002 | Dolin et al. ................ 718/102 |
| 6,668,269 B1 | * | 12/2003 | Kamada et al. ............. 718/103 |
| 6,684,399 B1 | * | 1/2004 | Grooters ...................... 725/48 |

OTHER PUBLICATIONS

Oliver, Netcape 2 Unleashed, Sams.net Publishing, pp. 488–491, Feb. 1996.*

(List continued on next page.)

*Primary Examiner*—Stephen S. Hong
*Assistant Examiner*—Cong-Lac Huynh
(74) *Attorney, Agent, or Firm*—Leydig, Voit & Mayer, Ltd.

(57) ABSTRACT

An invention for specifying and synchronously executing an extensible set of events along a single timeline is disclosed. More specifically, an invention for specifying an extensible set of multimedia events within an HTML document and for synchronously invoking the specified events along a single timeline within a Web environment is disclosed. First, a plurality of multimedia events are specified, with each event having a single or plurality of scheduled time(s) on the timeline for its invocation. After the playing of the timeline is started, events from the extensible set of events are executed at their respective predetermined time(s). Furthermore, an arbitration mechanism is provided for determining the order to execute a plurality of events scheduled to be executed at the same time, and a drop threshold mechanism is provided for not executing an event when its actual execution time has exceeded its scheduled execution time by more than a specified window of execution.

37 Claims, 21 Drawing Sheets

OTHER PUBLICATIONS

Brown, Using Netscape 2, Que Corporation, pp. 934–943, Feb. 1996.*

David Flanagan, Java in a Nutshell, O'Reilly & Associates, Inc., Second Edition, 1997, pp. 131–134, 239–241.*

*The Virtual Reality Modeling Language Specification, Version 2.0,* n.pag. Online. Internet: available http://www.web3d.org.vrml2.0/final/spec.

Dragan, Rich, "Lights, Camera, Action! Java Reaches Extreme Multimedia with Microsoft Direct Animation", *Computer Shopper,* vol. 17, No. 7, p. 580, Jul. 1997.

Dragan, Rich, "What's the Code", *Computer Shopper,* vol. 17, No. 7 p. 580, Jul. 1997.

Campbell, Monica, "Macromedia Debuts Flash 2.0 With Sound", *MacWEEK,* vol. 11, No. 13, p. 14, Mar. 31, 1997.

Koulouthros, Yvonne, "Designs on the Future", *PC Magazine,* vol. 15, No. 22, p. 36, Dec. 17, 1996.

Hamblen, Matt, "Tool Promises Web Authoring Without HTML", *Computerworld,* vol. 30, No. 50, p. 9, Dec. 9, 1996.

Jones, Chris, "FreeHand Has Designs on 'net; Macromedia tool streams 3–D from Web Servers to Users", *InfoWorld,* vol. 18, No. 36, p. 35, Sep. 2, 1996.

"MacroMedia Revamps Freelance Graphics Suite", *PC Week,* vol. 13, No. 35, p. 27, Sep. 2, 1996.

Sliwa, Carol, "Macromedia Gives Shockwave More Jolt; Users to Get Higher Quality Streamed, Compressed Audio", *Network World,* vol. 13, No. 31, p. 37, Jul. 29, 1996.

Jones, Chris, "Director Plug–ins to Allow Live Audio, Video Streaming on Web", *InfoWorld,* vol. 18, No. 21, p. 52, Mar. 18, 1996.

Elia, Eric, "Macromedia Unveils Shockwave and Director 5", *Newmedia,* vol. 6, No. 1, p. 19, Jan. 2, 1996.

Yamada, Ken, "Macromedia an Early Adopter of Intel MMX", *Computer Reseller News,* No. 700, p. 57, Sep. 9, 1996.

"Intergraph Canada, Macromedia Unite on Multimedia Authoring", *Computing Canada,* vol. 22, No. 16, p. 49, Aug. 1, 1996.

Jones, Chris, "Macromedia Streams Digital Audio on Web; Shockwave Upgrade Supports Near–CD–Quality Sound", *InfoWorld,* vol. 18, No. 31, p. 29, Jul. 29, 1996.

Ryer, Kelly, "Sounds in Shockwave", *MacWEEK,* vol. 10, No. 29, p. 14, Jul. 2, 1996.

Ozer, Jan, "Macromedia Director Brings Net Closer to Real Time: Streaming Multimedia to Replace Download–to–Disk Movies", *Computer Shopper,* vol. 16, No. 6, p. 533, Jun. 1996.

Safreed, Sean J., "New Directions for Director 5.0", *MacUser.* vol. 12, No. 5, p. 26, May 1996.

Darrow, Barbara, "Macromedia Revises Director", *Computer Reseller News,* No. 676, p. 151, Mar. 25, 1996.

Jones, Chris, "Director Plug–ins to Allow Live Audio, Video Streaming on Web", *InfoWorld,* vol. 18, No. 12, p. 52, Mar. 18, 1996.

"Macromedia", *Multimedia Business Report,* vol. 5, p. 7, Mar. 15, 1996.

Jones, Chris, "Macromedia Speeds Up with Director 5", *InfoWorld,* vol. 18, No. 11, p. 30, Mar. 11, 1996.

"Structured Graphics Control", Microsoft Developer Network Library Edition—Oct. 1997, Microsoft Corporation (1997).

"Microsoft Internet Explorer 4.0 White Paper" found online at http://www.microsoft.com/windows/ie/press/iwhite/white003.htm, last updated Jul. 2, 1997. ©1997.

Gates, Bill. "Q&A: Which chief executive officers do you admire?" found at http://www.microsoft.com/BillGates/1996Q&A/QA961217.htm and dated Dec. 17, 1996.

"Microsoft Visual Basic 5.0 Control Creation Edition Launches Explosion in Component Market" (Microsoft Corporation press release dated Dec. 11, 1996).

Digital Equipment Corporation. "FOCAL." ©1969 Digital Equipment Corporation. Reprinted at http://www.cs.uiowa.edu/~jones/pdp8/focal/ by Douglas W. Jones with permission in 1997.

Klein, Rob. "TagArea" (Java ™ applet), uploaded Feb. 19, 1996 to http://www.javaboutique.internet.com.

Kay, Marcus. "animateButton" (Java ™ applet), uploaded Sep. 23, 1996 to http://www.javaboutique.internet.com.

Hars, Florian. "ANButton" (Java ™ applet, including source code), uploaded Feb. 14, 1996 to http://www.javaboutique.internet.com.

Shaio, Sami. "Chart" (Java ™ applet), uploaded Sep. 13, 1996 to http://www.javaboutique.internet.com.

Stern, Barry. "PDP–8 Simulator" (Java ™ applet), uploaded Jan. 20, 1997 to http://www.javaboutique.internet.com.

Naick, Bijoy. "VertTicker.java" (Java ™ applet), found on http://www.javaboutique.internet.com, source code dated Dec. 1997.

"Uniform Resource Locator" See RFC 1738, "Uniform Resource Locators," T. Berners–Lee, L. Masinterm and M. McCahill, Dec. 1994, available at http://info.internet.isi.edu/in–notes.rfc/files/rfc1738.txt.

HTML 3.2 DTD (Document Type Declaration), Jan. 14, 1997, available at http://www.w3.org/TR/REC–html32.html.

Graham, Ian S. *HTML Sourcebook, Third Edition.* John Wiley and Sons, New York, ISBN 0–471–17575–7. Published Feb. 24, 1997.

Raggett, Dave. Hypertext Markup Language Specification Version 3.0 (Internet Draft). Mar. 28, 1998. Available at http://newton.ex.ac.uk/general/docs/Web docs/draft–ietf–html–specv3–00.txt.

Poole, Lon, McNiff, Martin, Cook, Steven. *Apple II Users Guide for Apple II Plus and Apple IIe, Third Edition.* Osborne McGraw–Hill, Berkeley, CA. ISBN 0–97–881176–7. 1985.

* cited by examiner

300

305　310　315 320　325　330　　335　　　340　　345 object.item("actionsetname").At(time,"script",[loop [,interval [,tiebreak [,drop threshold]]]])

FIG. 2

350 sub Seq_OnInit
355 —   call Seq("Set1").At(0.1, "event1", -1, 1.0, 1, 1.0)
360 —   call Seq("Set1").At(1.5, "event2",  3, 0.1, 2, 1.0)
365 —   call Seq("Set1").At(1.5, "event1", 17, 0.3, 3, 1.0)
370 —   call Seq("Set1").Play
    end sub

390 sub Button_OnClick
395 —   Seq("Set1").Stop
    end sub

FIG. 3

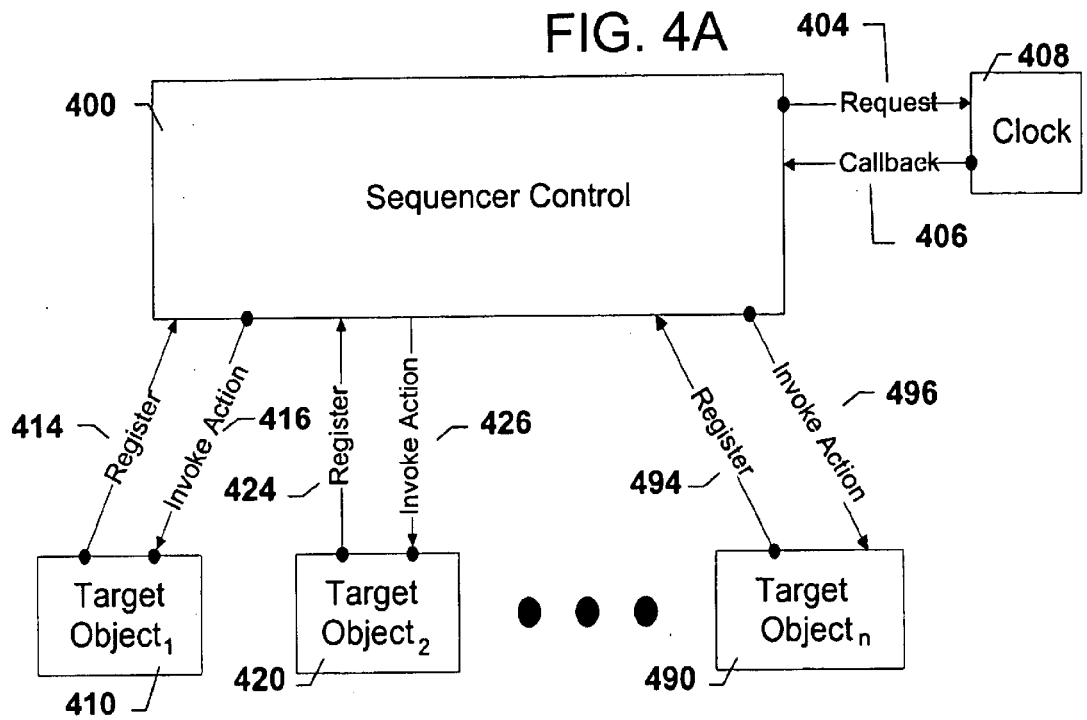
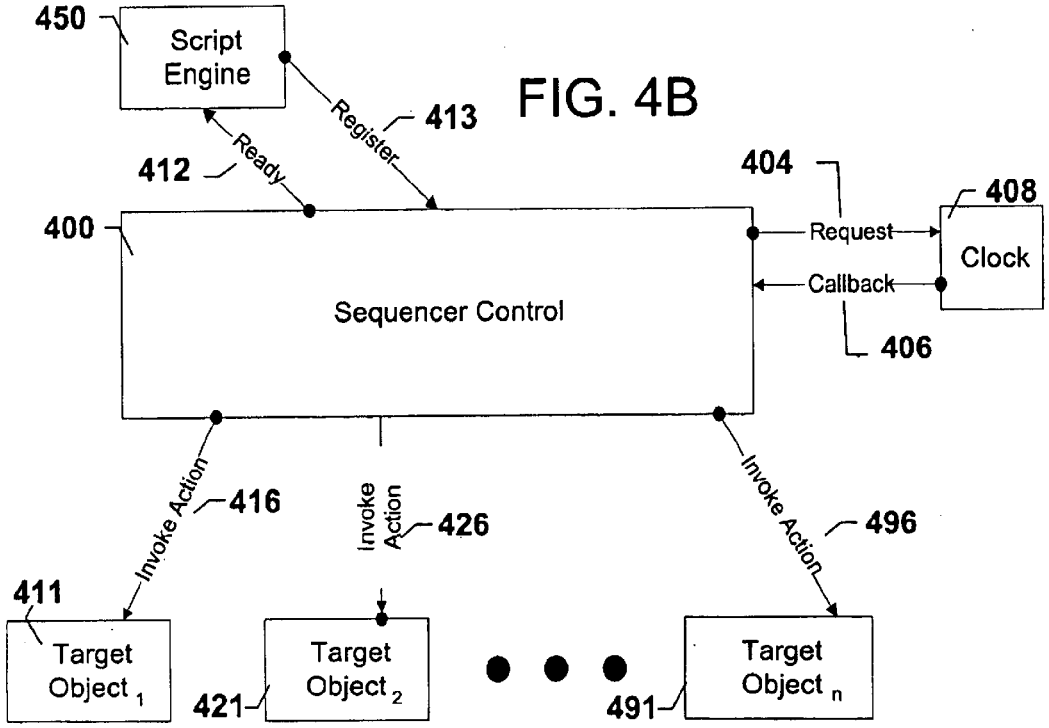

Sequencer Control

The Sequencer control provides timing and sequencing services for action sets, scripts used to control ActiveX™ controls or scripts on the page. The sequencer calls Jscript, VBScript or other Web scripts.

These procedures are called by the sequencer's At Method and can be performed once or they can be looped by the sequencer. The sequencer calls the named script with the parameter string and the resolved parameter string is executed. Note that this means unresolved parameters don't get executed.

To use the sequencer object, you must first instantiate it on the HTML page.

Syntax:
```
<OBJECT id=object
       STYLE=""
       CLASSID=clsid :B0A6BAE2-AAF0-11d0-A152-00A0C908DB96>
</OBJECT>
```

Parameters
*object*  The name of the sequencer, to be used in script.

Method Description
At  Specifies a new action in the action set.
  Pause  Stops action set playback at current position. Keeps time pointer and queue.
  Play  Starts the action set (if stopped). Resumes sequencer playback if sequencer is paused. Ignored if sequencer is playing.
  Seek  Changes the current playback position of the action set to a new, specified time.
  Stop  Stops action set playback, resets its playback position to the beginning.

| Event | Description | Parameters |
|---|---|---|
| OnInit | Occurs when sequencer is first completely loaded into memory | |
| OnPause | Occurs when action set playback has been paused. | Name of action set |
| OnPlay | Occurs when the action set has started playback. This event is only called when the action set starts playback from a stopped or paused state, not when a currently playing action set loops back to the beginning to repeat playback. | Name of action set |
| OnSeek | Occurs after the Seek method call has been completed. | Name of action set |
| OnStop | Occurs when the action set playback ends or is stopped. | Name of action set |

For optimal performance, use only one sequencer on a page with a single action set that calls a lot of actions. You can run multiple sequencers that each execute fewer action sets simultaneously but will get better performance with a single sequencer executing a larger number of action sets.

As the page is loaded, the sequencers used are loaded into memory. You can use the OnInit Event to ensure that the sequencers are fully loaded before starting their playback.

FIG. 8A - SEQUENCER CONTROL

Action Set
A logical grouping of named procedures that are used to control the timing and behavior of objects on the page. Action sets have the following properties:

| Property Name | Description |
|---|---|
| PlayState | Returns the current playback state of the action set. 0=stopped, 1=playing, 2=paused. Read-only at run time. |
| Time | Returns the elapsed time in format seconds/milliseconds (SS.MSS) since the start of action set playback, including iterations. The default setting is zero (0). Read-only at run time. |

FIG. 8B - ACTION SET

PlayState Property

Description
Returns the state of the sequencer. Read-only at run time.

Syntax
VBScript Syntax
    playstate = object("actionsetname").PlayState
JScript Syntax
    playstate = object.item("actionsetname").Playstate

| Parameter | Description |
|---|---|
| *object* | Name of sequencer. |
| *actionsetname* | Name of the action set. |
| *playState* | Return value - integer, indicating play state of the sequencer. Possible values are 0 (stopped), 1(playing) or 2 (paused). |

FIG. 8C - PlayState Property

Time Property

Description
Represents the amount of time since the start of the sequencer's playback. Read-only at run time.

Syntax
VBScript Syntax
    Time = object("actionsetname").Time

JScript Syntax
    Time = object.item("actionsetname").Time

| Parameter | Description |
|---|---|
| object | Name of sequencer. |
| actionsetname | Name of the action set. |
| Time | Return value - float, format seconds.milliseconds (s.mss), the elapsed sequencer playback time. |

FIG. 8D - Time Property

At Method

Description
Specifies an action to take place within an action set.

Syntax
VBScript Syntax
    call object("actionsetname").At(time, "script", [loop, interval, tiebreak, drop threshold])

JScript Syntax
    object.item("actionsetname").At(time, "script", [loop, interval, tiebreak, drop threshold]);

| Parameter | Description |
| --- | --- |
| object | Name of sequencer. |
| actionsetname | Name of the action set. |
| time | Required. Double value, format: seconds.milliseconds (SS.MSS). Sets the start time for the specified action. |
| script | Required. Text string identifying the named procedure to be called. Can pass parameters as part of the script call, for example, script(param1) |
| loop | Optional. Integer. Sets the loop count for this action. The default is 1. If set to -1, looping is infinite. Any negative number other than -1 will be treated as 0. 0 loop count value prevents execution. This can be used to programmatically halt action set execution. |
| interval | Optional. Double value, format: seconds.milliseconds (SS.MSS). Sets the delay between iterations of this action. Minimum interval resolution is 20 milliseconds (00.020). The default is 33 milliseconds (00.033), equivalent to 30 frames per second. |
| tie break | Optional. Integer, -1(default), 0-n. Sets the priority for the action. In the event that two actions happen at the same time, the action with the lower tie break number will be performed first. 0 is the highest priority action that is capable of being dropped. -1 is the lowest priority action and will be executed last. |
| drop threshold | Optional. Double value, format: seconds.milliseconds (SS.MSS). Sets the time by which the action must be performed before it is dropped from the queue. The default value is for the action to never be dropped (-1.000). |

Remarks
The drop threshold parameter is useful for optimizing sequencer performance by streamlining the number of actions that the sequencer has to perform at any given moment, for instance, when starting up a complex action set. Thoughtful use of this parameter can keep the sequencer from slowing down or speeding up from backlog of actions to be executed and keep the timing of actions within reasonable tolerances.

FIG. 8E – At Method

Pause Method

Description
Stops the sequencer's playback, but maintains the current playback position.

Syntax
VBScript syntax
    call object("actionsetname").Pause

JScript Syntax
    object.item("actionsetname").Pause( )

| Parameter | Description |
|---|---|
| *object* | Name of sequencer. |
| *actionsetname* | Name of the action set. |

FIG. 8F - Pause Method

Play Method

Description
Starts the sequencer or resumes it if the sequencer was paused. If the sequencer is currently playing, the call is ignored.

Syntax
VBScript Syntax
    call object("actionsetname").Play

JScript Syntax
    object.item("actionsetname").Play( )

| Parameter | Description |
|---|---|
| *object* | Name of sequencer. |
| *actionsetname* | Name of the action set. |

Remarks
EXAMPLE: This example starts a sequencer described by the Seq object when the page loads. This sequencer calls the MoveButton action set at time 0, and calls the named procedure MoveButton.

```
<SCRIPT LANGUAGE=vbscript>
<!--
Sub window_onLoad
    Call Seq("MoveButton").Play
End Sub
-->
</SCRIPT>
```

FIG. 8G - Play Method

Seek Method

Description
Changes the current playback position of the Sequencer to another specified point in playback.

Syntax
VBScript Syntax
```
call object("actionsetname").Seek(time)
```

JScript Syntax
```
object.item("actionsetname").Seek(time)
```

| Parameter | Description |
|---|---|
| *object* | Name of sequencer. |
| *actionsetname* | Name of the action set. |

FIG. 8H - Seek Method

Stop Method

Description
Stops the sequencer and resets its current position to the beginning.

Syntax
VBScript Syntax
```
call object("actionsetname").Stop
```

JScript Syntax
```
object.item("actionsetname").Stop( )
```

| Parameter | Description |
|---|---|
| *object* | Name of sequencer. |
| *actionsetname* | Name of the action set. |

Remarks
EXAMPLE: This example stops the sequence when the btnEnd button is clicked.

```
<SCRIPT LANGUAGE=vbscript>
<!--
Sub btnEnd_OnClick
    Call Seq("MoveButton").Stop
End Sub
-->
</SCRIPT>
```

The sequencer automatically stops when the page is unloaded.

FIG. 8I - Stop Method

OnInit Event

Description
Called when the page is loaded, when the sequencer has finished loading into memory. At this point, the script is executed. This event is generally used to load the rest of the procedures to be run on the client side.

Syntax
VBScript Syntax
    Sub object_oninit
        script
    End Sub

JScript Syntax
    < script language="javascript" for="object" event="oninit">
    <!--
        script
    //-->
    </script>

| Parameter | Description |
| --- | --- |
| *object* | Name of sequencer. |
| *actionsetname* | Name of the action set. |

Remarks

This example shows the oninit event used to play SeqMgr once it has finished loading the other sequencers that it controls. In this example, SeqMgr controls Seq1_Action1.

```
<SCRIPT LANGUAGE="VBScript">
<!--
Sub SeqMgr_oninit()
        Call SeqMgr("ActionSet1").At(0.000,"Seq1_Action1",300,0.100,1,100.000)
        Call SeqMgr("ActionSet1").Play
End Sub
-->
</SCRIPT>
```

FIG. 8J - OnInit Event

OnPause Event

Description
Called when the sequencer playback is paused. At this point, the script is executed.

Syntax
VBScript Syntax
```
Sub object_onpause(actionsetname)
    script
End Sub
```

JScript Syntax
```
< script language="javascript" for="object"
event="onpause(actionsetname)">
<!--
    script
//-->
</script>
```

| Parameter | Description |
|---|---|
| *object* | Name of sequencer. |
| *actionsetname* | Name of the action set. |

Remarks
This example tests the "actionsetname" parameter passed (a variable set to the name of the action set last paused) conditionally executes a script based on which action set has been paused.
```
Sub Sequencername_ onpause(actionsetname)
    If actionsetname = "ActionSet1" then
        button1.value = "Play"
    Else
        button1.value="Pause"
    Endif
End Sub
```

FIG. 8K - OnPause Event

OnPlay Event

Description
Occurs when the sequencer starts playback. At this point, the script is executed.

Syntax
VBScript Syntax
    Sub SequencerName_ onplay(actionsetname)
        script
    End Sub JScript Syntax
    < script language="javascript" for="object" event="onplay(actionsetname)">
    <!--
        script
    //-->
    </script>

| Parameter | Description |
|---|---|
| object | Name of sequencer. |
| actionsetname | Name of the action set. |

Remarks
This example tests the "actionsetname" parameter passed (a variable set to the name of the action set last played) and conditionally executes a script based on which action set has been played.

```
Sub Sequencername_ onplay(actionsetname)
        If actionsetname = "ActionSet1" then
              Call Seq("ActionSet2").stop
        Else
              Call Seq("ActionSet1").stop
        Endif
End Sub
```

FIG. 8L - OnPlay Event

OnSeek Event

Description
Called after the Seek method is invoked against a sequencer has completed changing the playback position. At this point, the script is executed.

Syntax
VBScript Syntax
     Sub object_ onseek (actionsetname, newtime)
        script
     End Sub JScript Syntax

```
< script language="javascript" for="object" event="onseek(actionsetname, newtime)">
<!--
        script
//-->
</script>
```

| Parameter | Description |
|---|---|
| *object* | Name of sequencer. |
| *actionsetname* | Name of the action set. |

Remarks
This event can be useful in determining where the sequencer playback has been moved and set up conditional action based upon the sequencer's new position. However, you can not have an OnSeek event call a seek method that seeks to a position within the same actionset from which the OnSeek event originated.

```
Sub Sequencername_ onseek(actionsetname, time)
        If actionsetname = "ActionSet1" then
                If time = 10.000 then
                        Call Seq("ActionSet2").Play
                Else
                        Call Seq("ActionSet1").Play
                EndIf
        EndIf
End Sub
```

FIG. 8M - OnSeek Event

OnStop Event

Description
Called when the sequencer is stopped. At this point, the script is executed.

Syntax

VBScript Syntax
```
Sub SequencerName_ onstop(actionsetname)
    script
End Sub
```

JScript Syntax
```
< script language="javascript" for="object" event="onstop(actionsetname)">
<!--
    script
//-->
</script>
```

| Parameter | Description |
|---|---|
| *object* | Name of sequencer. |
| *actionsetname* | Name of the action set. |

Remarks
This example tests the "actionsetname" parameter passed (a variable set to the name of the action set last stopped) and conditionally executes a script based on which action set has been played.

```
Sub Sequencername_ onstop(actionsetname)
        If actionsetname = "ActionSet1" then
                Call Seq("ActionSet2").play
        Else
                Call Seq("ActionSet1").play
        Endif
End Sub
```

FIG. 8N - OnStop Event

```
<HTML>
<HEAD>
    <TITLE>Microsoft DirectAnimation Controls - Sequencer</TITLE>

<SCRIPT LANGUAGE=VBSCRIPT>

Sub Window_OnLoad
        call sgMSDHTML.SetIdentity
        Button1.value="Pause"
End Sub Sub Seq_oninit
        call seq("ActionSet1").At(0.000, "RotateAll",-1, 0.050, 1)
    Call   Seq("ActionSet1").Play
End Sub Sub RotateAll
        Call sgMSDHTML   .Rotate(0,9,2)
End Sub
Sub Start
        Select Case Button1.value
        Case "Play"
            Call   Seq("ActionSet1").Play
              Button1.value="Pause"
        Case "Pause"
            Call   Seq("ActionSet1").Pause
              Button1.value="Play"
        End Select
End Sub
</SCRIPT>
</HEAD>
 <BODY BGCOLOR=BLACK>
 <OBJECT ID=sgMSDHTML
    STYLE="POSITION: ABSOLUTE;
HEIGHT     :300;WIDTH:450;TOP:100;LEFT:60;VISIBILITY:VISIBLE; ZINDEX:-1"
    CLASSID="CLSID     :369303C2-D7AC-11d0-89D5-00A0C90833E6">
   <PARAM NAME="Line0001" VALUE="     SetLineColor(255,255,255)">
   <PARAM NAME="Line0002" VALUE="     SetFillColor(0,0,255)">
   <PARAM NAME="Line0003" VALUE="     SetFillSTYLE(1)">
   <PARAM NAME="Line0004" VALUE="     SetLineSTYLE(1)">
   <PARAM NAME="Line0005" VALUE="     SetFont('Verdana',60,650,0,0,0)">
   <PARAM NAME="Line0006" VALUE="     Text('Microsoft', -120, -100, 0)">
   <PARAM NAME="Line0007" VALUE="     Text('Dynamic', -120, -50, 0)">
   <PARAM NAME="Line0008" VALUE="     Text('HTML', -90, 0, 0)">
   <PARAM NAME="Line0009" VALUE="     Text('Multimedia', -120, 50, 0)">
 </OBJECT>

<OBJECT ID="Seq"
        CLASSID="CLSID     :B0A6BAE2-AAF0-11d0-A152-00A0C908DB96"
        STYL E="WIDTH  :2;HEIGHT:2">
 </OBJECT>
   <INPUT TYPE=button ID="Button1"
     STYLE="POSITION     :ABSOLUTE; TOP:10; LEFT:10; z-index:2; VALUE=""; OnClick="Start">
</BODY>
```

FIG. 8O - Sequencer Control VBScript Example

METHOD AND APPARATUS FOR CONTROLLING THE TIMING OF THE INVOCATION OF EVENTS WITHIN A COMPUTER RUNTIME ENVIRONMENT

FIELD OF THE INVENTION

This invention relates to computer programming, more particularly, to a method and apparatus for controlling the timing of the invocation of events within a computer runtime environment, and specifically, timing the invocation of multimedia events within a Web page runtime environment.

BACKGROUND OF THE INVENTION

The Internet and the World Wide Web are rapidly expanding, with businesses and individuals hosting their own Web pages. This has created a demand for richer Web page capabilities especially in the area of coordinated presentation and control of multimedia events, including being able to easily synchronize the execution of a plurality of multimedia events from a single point in time (i.e., playing a multimedia timeline). Because not all Web page owners are sophisticated computer users, the design and programming of Web pages must remain simple. Nor should synchronizing the execution of multimedia events to a timeline defined within in a Web page require complicated or lengthy user programs, or require the use of an external application which increases the cost of a solution. Instead designing and programming a Web page should be intuitive (i.e., "user-friendly"), while still providing sophisticated capabilities, such as prioritization of events which are scheduled for the same time and defining a window for execution of a time critical event.

Web pages are composed of various multimedia elements, controls, and applets as defined by the Hypertext Markup Language (HTML) for a given Web page. Multimedia can be characterized as some combination of visual media, audio media and time. Multimedia is an open environment, with timing being the common thread across all multimedia events. Multimedia experiences, such as the movement of graphics and the playing of sound, require coordinated execution of these events. For instance, the playing of a sound bite of a door slamming should be coordinated with the animation of the door closing so the sound is heard upon the visual closing of the door (and not before or after such time).

Providing synchronized multimedia experiences is complicated because timing control information is not inherent in the content of an HTML document. Past attempts at providing such synchronization and timing control of activities within a Web page have basically take on one of two forms: (1) external programs and (2) lengthy, complicated scripts or programs. These solutions generally are non-user-friendly, require additional expenses, and do not provide true synchronization of multiple events to a single timeline. Additionally, other approaches have not allowed synchronization between application-specific components (e.g., graphics and audio) and host-intrinsic components (e.g., HTML elements).

External multimedia control programs, such as Director, by Macromedia, can be expensive, and do not allow the direct creation and modification of a multimedia timeline by editing the HTML code. Rather, any changes and additions to the multimedia timeline must be made using the external program itself. Furthermore, the timing mechanism of some of these external programs are based on "frames" of time rather than directly on a time scale. A frame corresponds to a duration of time during which a set of defined activities are to be performed. Frames provide a method to sequentially perform sets of activities where there is some timing relationship based on frame rates and the time required for the sets of activities within the frame to be performed. However, individual events are not specified to be executed at a particular time (e.g., at time t=10.000 seconds), rather to execute within a frame (e.g., in frame 2) which does not provide an intuitive indication of the exact time for executing the event.

A second approach has been to write lengthy code or scripts within a control loop of the computer program which evaluates the current time each time through the control loop. In which case, the control loop can tie up an entire processing thread which does not allow other applications or processes to proceed, or at least requires extra computer cycles. Every time the control loop is executed, a large number of statements must be evaluated to determine whether to execute the actual events. This approach is less than desirable, especially as the number of events to control increases beyond one or two. In this case, scripts become long and complicated, and often more complex than a typical Web author knows how to create by hand. The control loop requires a large amount of processing time to determine whether to execute an event, which is disadvantageous especially in the multimedia context where events must be synchronized to a timeline having a granularity on the order of milliseconds. Furthermore, to guarantee a desired performance, the number of events controlled by a control loop must remain small because the control loop must iterate at a rate at least as great as the fastest timing requirement. Moreover, in many implementations such as those using an HTML document, the code within the control loop is written as an interpreted script thus compounding its evaluation time in comparison with that which is implemented using a built-in service or compiled code. Therefore, as the number of events to control becomes large, the timing performance correspondingly degrades and the granularity to which events can be set to perform becomes coarser. Moreover, the timing performance varies significantly and unpredictably depending on the power, performance, and current operating load of the computer on which these scripts or sets of code are run.

A variant of this approach uses a software timer control to generate a control event on a regular basis and causing a control program to execute. The control program then evaluates the current time and initiates the execution of the desired multimedia event. For instance, on a Web page, the setTimeout command can be used. This HTML code variant is more desirable than that of a control loop as it decreases the amount of evaluation code required. However, using this approach, it is cumbersome at best to stop the execution of sets of active timelines, and, more importantly, there is no synchronization of two events to a single timeline. Instead, these events are independently scheduled when their respective setTimeout command is interpreted and therefore, they are not synchronized. Furthermore, when multiple events are scheduled to begin execution at the same instant of time, the order in which the events will be executed is undefined for the setTimeout command (and commonly in other timing control approaches) which means a Web page does not necessarily produce the same results every time it is run, either on the same or on a different platform. Furthermore, this approach has disadvantageous performance limitations because the scripts become long and complex similar to that of an approach previously described herein, and the timing performance is unpredictably sensitive to the performance of the machine on which these set of code or scripts are executed.

In addition to their performance limitations, the prior approaches are directed towards basic timing control. In other words, these approaches only provide a way of initiating the execution of an activity at some defined point in the future, which is only a subset of the identified need in the computer industry for controlling multimedia experiences and applications. Lacking from these prior approaches are robust capabilities for providing true prioritization among events scheduled to happen at the same time, and a drop threshold capability to ensure that time sensitive events whose execution windows have expired are not executed.

In non-Web environments, schedulers have been provided to be able to start a process at a specified future time (e.g., a UNIX "chron" job). However, these schedulers do not provide the capabilities required for synchronizing a plurality of multimedia events along a timeline. For instance, the timing granularity of such schedulers is usually on the order of seconds, with no exact guaranteed starting time. Moreover, these schedulers do not accommodate single or multiple timelines with an accuracy of milliseconds for initiating actions as required for presentation of multimedia experiences. Moreover, they do not provide enhanced features for controlling the invocation of events such as drop threshold or priority arbitration mechanisms.

SUMMARY OF THE INVENTION

According to the invention, a sequencer control invokes events from an extensible set of events at their respective predetermined time(s), uses an arbitration mechanism to determine the execution order of multiple events scheduled for the same time, and provides a thresholding mechanism to determine whether not to invoke a scheduled event when an event's actual invocation time exceeds its scheduled invocation time by its specified drop threshold time period. This sequencer control performs predictably and consistently on a wide range of client hardware configurations representing a broad range of performance profiles. Using this sequencer control to initiate multimedia events within a Web page, a deterministic presentation is provided whereby the multimedia events are synchronized according to a specification which runs the same on every browser hosting the sequencer control. Outside the Web page environment, a sequencer control provides a way of synchronizing the execution of events for a variety of applications and environments including operating and windowing systems. The terms "event" and "action" are interchangeably used herein to refer to any item that can be invoked by the sequencer control. The set of events which can be invoked by the sequencer control is extensible to encompass most any computer activity, including scripts, applications, objects, procedures, methods, interfaces, sending messages, generating a computer event, or the like.

More specifically, the invocation time for each multimedia event within the one or more extensible sequence sets of events is defined by a specification in an HTML document which can be created using a standard text editor. Each of these extensible sets of events corresponds to a single multimedia timeline. This specification includes the event, the time to invoke this event, and a sequence set. Additionally, this specification optionally includes (1) a loop count for the number of times to invoke the event, (2) an interval value quantifying the time between the invoking of repeating events, (3) a tie break number specifying a priority for determining an order of events when multiple events are scheduled for the same time, and (4) a drop threshold value identifying a window of time within which a scheduled event must be invoked or else it is ignored.

In keeping with the invention, the sequencer control accommodates variances in the starting times of events caused by processing delays of simultaneously scheduled events. When multiple events are scheduled for the same time, the invoking of some of these events will be delayed because only one event can be invoked at the same instant in time. This delay will vary according to the duration of the other events. As the sequencer control can accommodate an arbitrary number of sets of action with the actions being invoked at arbitrary time intervals, the order and timing of the invocation of events is not know a priori. Rather, it is only known at run time.

In one embodiment, the time required to invoke an event is determined by whether (1) the event is to execute in a thread apart from the sequencer control in which case the amount of delay is the time required to launch or interact with the event's process, or (2) the event executes within the same thread as that of the sequencer control in which case the amount of delay is the time required for the event to run to completion. In another embodiment, certain events executing in a thread apart from the sequencer control are completed before events scheduled for a subsequent time or those with a higher tiebreak value are executed. For instance, these certain events include events having non-default tiebreak values. Techniques known to one of ordinary skill in the art are used to synchronize the execution of events across multiple threads and processes, whether executing on the same or different processors or computers.

To accommodate these delays, the sequencer control provides the two enhanced capabilities of a tie break arbitration mechanism and drop threshold. For each event, a tie break priority value can be specified, which defines a priority for invoking an event when multiple events are scheduled to be invoked at the same time. The invoking order is then determined by sorting the events based on their priority values. By exploiting the tie break number arbitration mechanism, a user can specify the sequence for invoking multiple events scheduled at the same time, rather than this ordering being undefined and varying between browser or sequencer control implementations.

In addition, the drop threshold value in the specification defines a threshold time in which an event can be invoked. If the invocation time of an event exceeds its predetermined drop threshold period, the event is not invoked.

When a Web page having sequencer control commands is loaded, a data structure for each of the sequence sets is populated with the event invoking information and parameters. The sequence set is then executed by an explicit play command, or alternatively, the sequence set could be executed automatically upon completion of loading the sequence set or Web page. The sequencer control then determines the first time at which it has a scheduled event, and passes a request to a clock object, which calls back the sequencer control at the appropriate time.

Upon callback, the sequencer control retrieves all the events scheduled to be invoked since the last callback, or at or prior to the current time if this is the first callback. These events are placed in an execution queue in order based first on the time the actions are due to execute, and secondarily on their tie break numbers. The order within the execution queue determines their invocation order of the events. Before invoking an event, the sequencer control evaluates the event's drop threshold value, if specified, to ensure that the current time is within its invoking window, and if so, the event is invoked. Next, if the event is specified to repeat, it is re-scheduled for its next specified invoking time. After all the events in the queue have been invoked, the sequencer control determines the time for invoking the next event. If that time is in the future, then the sequencer control sets this time as the callback time with the clock routine, else the sequence controller queues and invokes these current events by following the above specified invoking procedure.

The sequencer control also provides real-time control of the playing of a timeline. The timeline can be played, paused, stopped, and the current execution time can be set to some time instant in the past or future using the seek command.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIG. 2 is a diagram showing the syntax of the sequencer control "At" method;

FIG. 3 is an exemplary script containing sequencer control commands;

FIGS. 4A–B are block diagrams of embodiments of the sequencer control in a computer system;

FIGS. 8A–O present descriptions, syntax, parameters, methods, events, and illustrations of the sequencer control and its commands.

DETAILED DESCRIPTION OF THE PREFERRED EMBODIMENT

Figure 1:
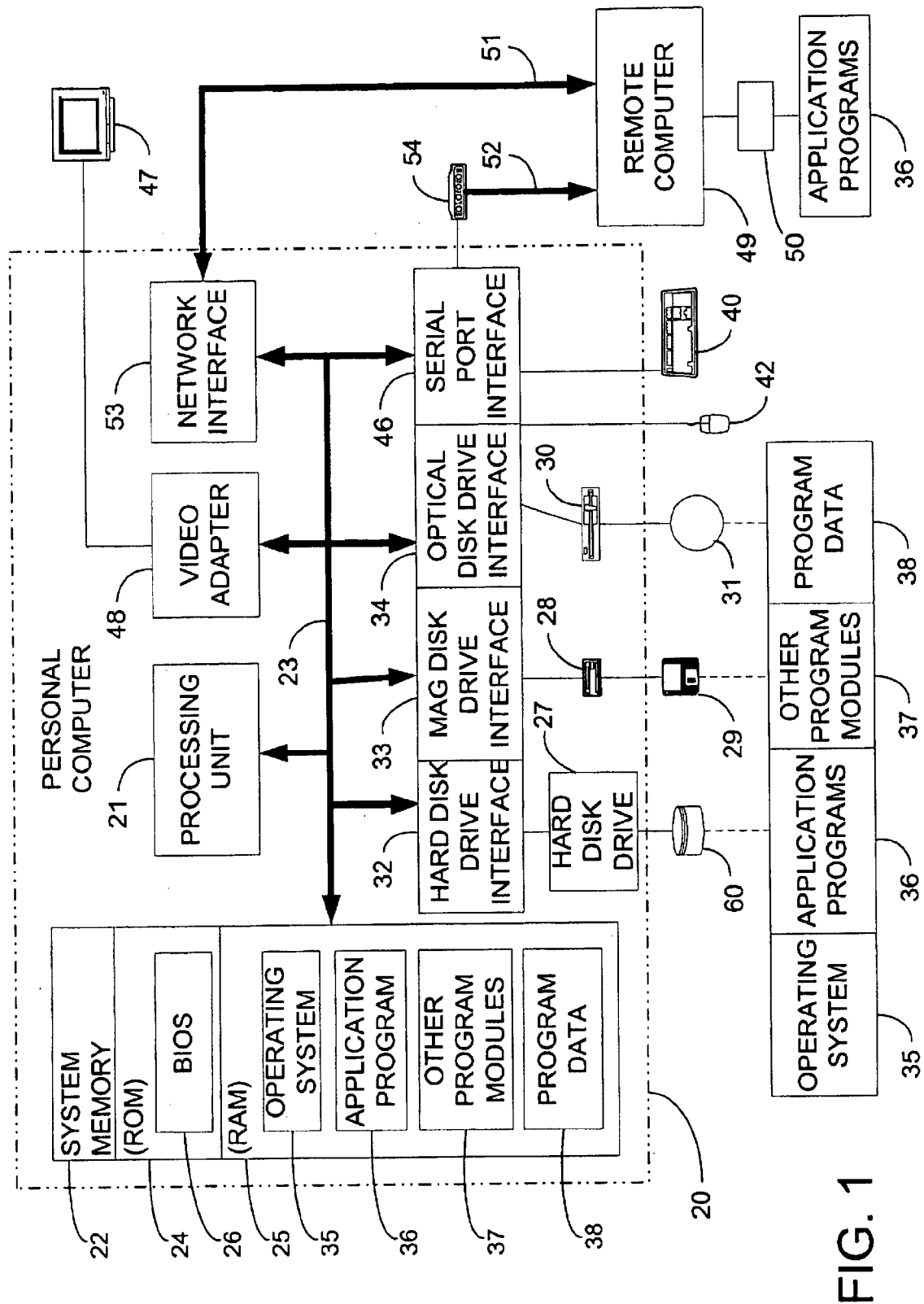
FIG. 1 is a block diagram of an exemplary operating environment in which the invention may be implemented, including a computer system for controlling the timing of the invocation of events within a computer runtime environment in accordance with the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, commands to perform the sequencer control are stored in system memory 22 and are executed by processing unit 21. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The invention disclosed herein is a comprehensive timing control solution for the invoking of multimedia events where the invoking of an event causes the event to be executed either asynchronously as the event executes in its own thread or within the sequencer control process. The present invention provides for the intuitive definition of an arbitrary and extensible number of multimedia events, and accommodates arbitrary starting and stopping of multiple timelines within a single Web page. By allowing the timing information to be specified in terms of a time, rather than being defined as part of a frame, specification of multimedia events is intuitive to the programmer, making it easier to program and debug over previous approaches. Moreover, the invention provides an arbitration mechanism to allow user definition of the order in which to execute events that are scheduled to be executed at the same instant in time; and a drop threshold mechanism for only executing time critical elements within a predetermined window threshold. In addition to being applicable within HTML defined documents and generally within a Web environment, the teachings of the invention disclosed herein are applicable outside the Web page arena to other domains requiring a comprehensive sequencer control, such as within an operating system, windowing environment, application, or the like.

Turning now to FIG. 2, illustrated is the JavaScript syntax for the sequencer control "At" method 300. This syntax is as follows: the name of the sequencer control 305; the name of the sequence or action set 310 identifying the timeline to which this sequencer control command belongs; the keyword 'At' 315 identifying the "At" method of the sequencer control 305; the invoking time 320 for the event in which script 325 will be called; an optional loop parameter 330 specifying the number of times to invoke the event 325 for every time interval 335; an optional tie break number 340; and, an optional drop threshold 345. This format allows a user to readily glean the invoking sequence which significantly lowers development and maintenance costs of a Web page.

FIG. 8E illustrates the "At" method by presenting user documentation and a more detailed description of one embodiment of the present invention. Furthermore, FIGS. 8A–8O illustrate user documentation describing the sequencer control syntax, parameters, methods, events, commands, examples for one embodiment of the present invention. Illustrated are the Sequencer Control (FIG. 8A); an Action Set (FIG. 8B); the PlayState and Time Properties of the Sequencer Control (FIGS. 8C–D, respectively); the At, Pause, Play, Seek, and Stop Methods (FIG. 8E–I, respectively); the OnInit, OnPause, OnPlay, OnSeek and OnStop Events (FIGS. 8J–N, respectively); and a Sequencer Control Visual Basic Script (VBScript) Example (FIG. 8O).

To illustrate the capabilities of the invention disclosed herein, shown in FIG. 3 is exemplary VBScript sequencer control script 350 defining a set of sequencer control commands within a Web page. Statements 355–365 define the timing characteristics for invoking the events listed in their respective statements. For instance, statement 365 specifies to add to sequencer control timeline "Set1", the event "event1" which is to be invoked at time 1.500 seconds after the start of sequencer control timeline "Set1". Additional parameters of statement 365 specify event "event1" is to be repeated 17 times at 0.300 second intervals, and that it has a tie break priority of 3, and a drop threshold invoking window of 1.000 seconds after the scheduled invoking of this event. A value of negative one (−1) for the loop parameter 330, as illustrated in statement 355, defines that the event is to be repeated forever (or at least until a Stop or Pause command is executed).

This exemplary sequencer control script also illustrates sequencer control Play command in statement 370, which directs the sequencer control to immediately begin execution of the "Set1" sequence set. A timeline author can also use buttons and other controls to effect the play of a sequence set. For instance, statement 395 of event handler 390 will be executed upon a button click causing sequencer control timeline "Set1" to stop playing. The sequencer control methods of play and stop are described in detail in FIGS. 8G and 8I, respectively. In addition, FIG. 8O provides an additional sequencer control script implemented in Visual Basic Script (VBScript).

Turning now to FIGS. 4A–B, shown are block diagrams of object-oriented embodiments of the sequencer control 400 in accordance with the present invention. In the embodiment shown in FIG. 4A, each target object (410, 420, 490) registers (414, 424, 494) with the sequencer control 400, using the "At" method (described in FIG. 8E), the events and their timing characteristics. In the embodiment of the present invention illustrated in FIG. 4B, a script engine 450, after receiving a ready 412 indication that the sequencer control has completed its initialization, registers 413 the events and their timing characteristics for the target objects (411, 421, 491). Once the execution of one or more timelines has begun, the sequencer control 400 determines the time to invoke the next registered event, and then places a request 400 with the clock object 408. When the registered time arrives, the clock object 408 initiates the callback 406 the appropriate interface of the sequencer control 400 at the requested time. Upon receipt of the callback 406, the sequencer control 400 evaluates the event(s) to invoke as described herein, resulting in one or more invoking actions (416, 426, 496) to cause the appropriate method within the target object (410, 420, 490 (FIG. 4A), 411, 421, 491 (FIG. 4B)) to be executed.

Figure 5:
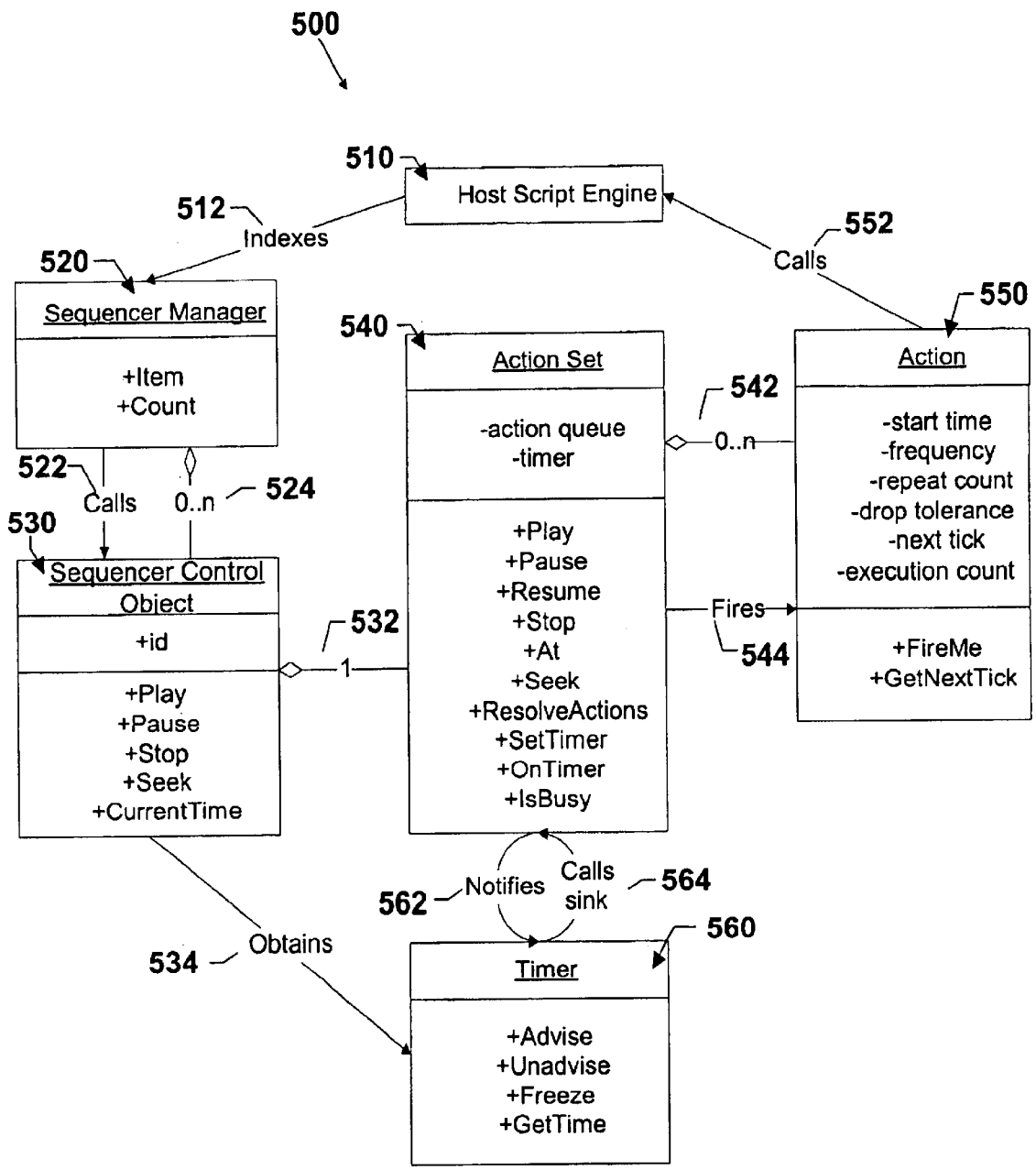
FIG. 5 is a unified modeling language (UML) diagram of the sequencer control architecture in accordance with one embodiment of the present invention.

Referring to FIG. 5, shown is a sequencer control object relationship diagram 500 illustrating the software architecture of the sequencer control 400. This diagram 500 is expressed in basic Unified Modeling Language (UML) which is well-known in the art. In FIG. 5, UML objects are depicted as boxes, with their names at the top, followed by their attributes, and then followed by their methods. The symbols prefacing the attributes and methods are their permissions. A public member is prefaced by '+', a protected member by '#', and a private member by '−'. The arrows refer to an inter-object relationship. Lines with diamonds indicate that one item is a component of another. Numbers or ranges on any relationship line or arrow indicate the cardinality of the relationship.

The components shown in the sequencer control object relationship diagram 500 include a host script engine 510 and objects which comprise the sequencer control 400 (FIG. 4) in one of many possible embodiments. These sequencer control objects comprise a sequencer manager 520, a sequencer control object 530, an action set 540, a timer 560, and an action 550. The host script engine 510 refers to a processing system where the interface of the sequencer control 400 is available, such as a Java engine or Microsoft Internet Explorer 4.0 in a Web environment, or even an operating system or application runtime environment. The sequencer manager 520 provides an interface to the different sequence sets defined within the sequencer control. Each sequence set is assigned to a sequencer control object 530 which controls the playing of the timeline by interacting with the associated action set. For each sequence set, there is exactly one action set 540 which is responsible for performing the timeline as defined by the invoking of events. Each event is stored in its own action object 550 which contains its invoking characteristics as defined using the "At" method. Finally, the timer 560 refers to a timer service which invokes the action set 540 at the appropriate registered time to invoke the next event. In one embodiment in accordance with the present invention, the timer 560 has a resolution of ten milliseconds and can queue as many events as are permissible under current memory conditions. When the action set 540 is invoked by the timer 560, the action set 540 determines the current elapsed time according to the timer 560 via the timer's 560 GetTime interface, determines which action 550 to invoke, and invokes the associated FireMe interface on the action 550. The invoked action 550 then calls the host script engine 510 to execute the action.

More specifically, the sequencer control 400 (FIG. 4) runs within the host script engine 510. The host script engine 510, through indexes 512, calls a sequencer manager 520 which defines an individual sequence set (multimedia timeline) using the Item method which returns a reference to the sequencer control object 530 corresponding to the specified sequence set. In another embodiment not requiring the use of multiple timelines, the sequencer manager 520 would not be required in which case the host script engine 510 would directly access the sequencer control object 530.

The sequencer control object 530 contains several methods including play, pause, stop and seek. Each of these methods is accessed by the host script engine to control the execution of a timeline. The sequencer control object 530 provides access to the action set which actually controls the events within the timeline. Internal to the action set 540 is an action queue which provides an interface to the individual action 550 events. The action set queue is sorted primarily by the time each action is due to execute and secondarily by the tie break numbers. Although the term queue is used, many different alternative implementations are possible including linked list structures and arrays.

The action set 540 includes many methods for controlling the execution of the associated timeline. These methods include play, pause, stop, at and seek operations, with a description of their interface and operation provided in FIGS. 8G, 8F, 8I, 8E and 8H, respectively.

In addition, methods are included to access the timer 560, which provides the timing signal at which point the action set 540 causes the invoking of the next action 550 (an event on the timeline). The action set 540 notifies 562 the timer 560 when the next event on the timeline is scheduled. The action set 540 then remains dormant until it receives another sequencer control command or until it receives a call 564 to its sink interface notifying the action set 540 to invoke the next event.

Figure 6A:
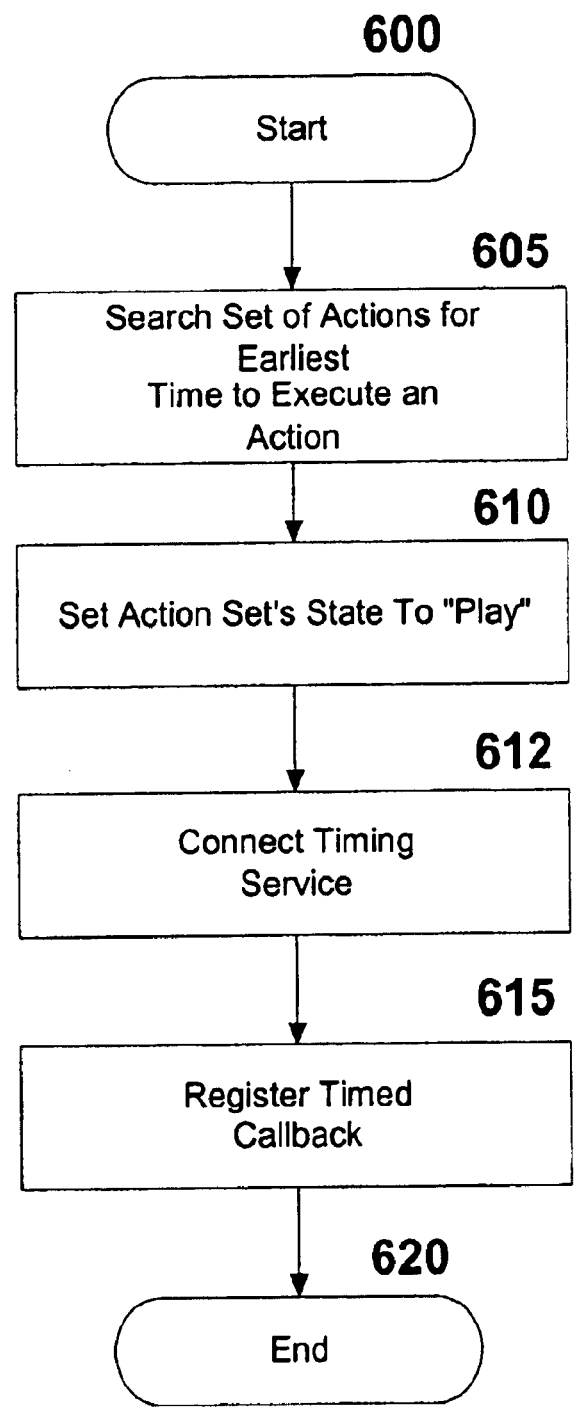
FIG. 6A is a high-level flow diagram of the sequencer control play method.

The execution of the play, pause, stop and seek methods of the sequencer control object 530 are respectively illustrated in FIGS. 6A–6D, with corresponding detailed descriptions provided in FIGS. 8G, 8F, 8I, and 8H. Referring now to FIG. 6A, described are the steps performed in response to the play method of the sequencer control object 530 (FIG. 5). The play method of the sequencer control object 530 is invoked by the host script engine 510 which in turn invokes the play method of the action set 540. In response, as indicated in step 605, the action set 540 determines the earliest scheduled invoking time of any action 550. Next, in step 610, the state of the action set 540 is set to play. At which point in step 612, the action set 540 connects to the timer 560, and in step 615, registers the earliest time to invoke any action 550. The processing of the timeline subsequently resumes when the callback 564 from the timer 560 is received as described hereafter with reference to FIG. 7.

Figure 6B:
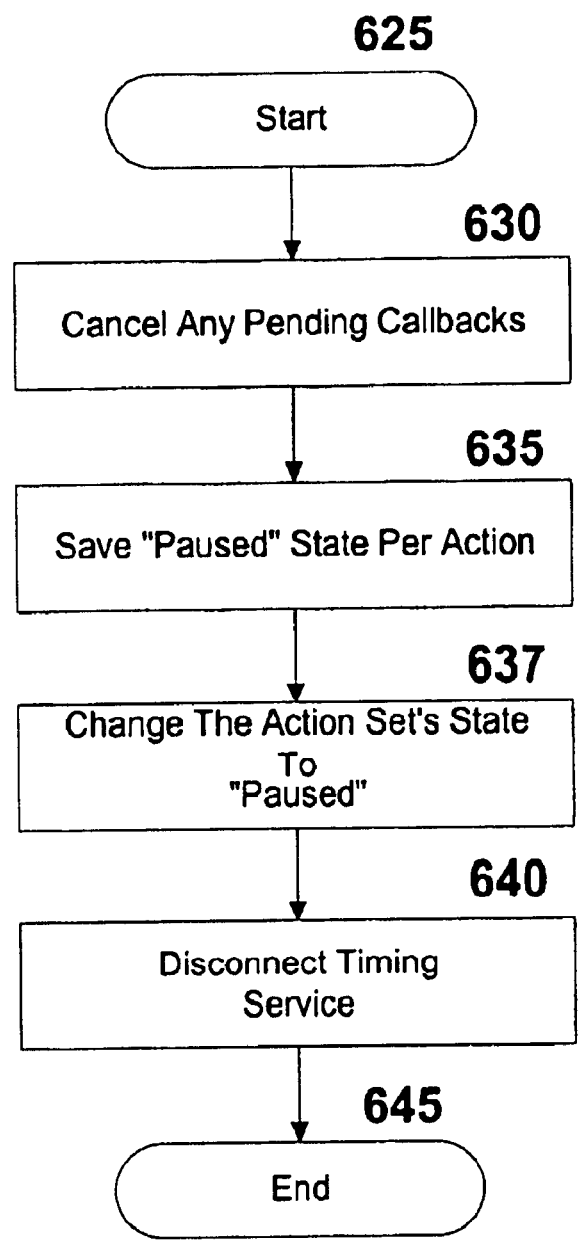
FIG. 6B is a high-level flow diagram of the sequencer control pause command.

FIG. 6B describes the steps performed in response to the pause sequencer control command. After the sequencer control object 530 (FIG. 5) receives the pause command from the host script engine 510, any pending callbacks are canceled in step 630. Next, in step 635, the state of each action 550 within the action set 540 is saved for possible future resumption. Then, in step 637, the state of the action set 540 is set to paused. At which point in step 640, the timer 560 is disconnected, thus freezing the performance of the timeline.

Figure 6C:
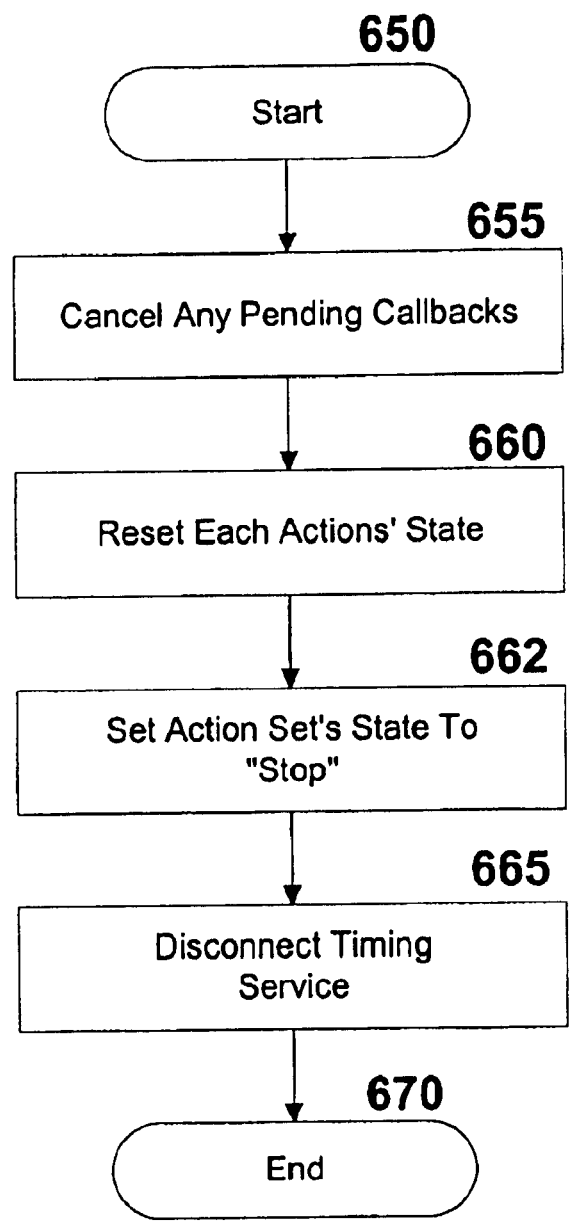
FIG. 6C is a high-level flow diagram of the sequencer control stop method.

Next, described in FIG. 6C are the steps performed in response to the stop sequencer control command. The stop command actually stops an event timeline from further performance. After a stop command is received by the sequencer control object 530, any pending callbacks are canceled in step 655. Next, in step 660, the state of each action set 540 is reset. Then, in step 662, the state of the action set 540 is set to stop. At which point, in step 665, the timer 560 is disconnected. Thus, no further events will be performed on the timeline.

Figure 6D:
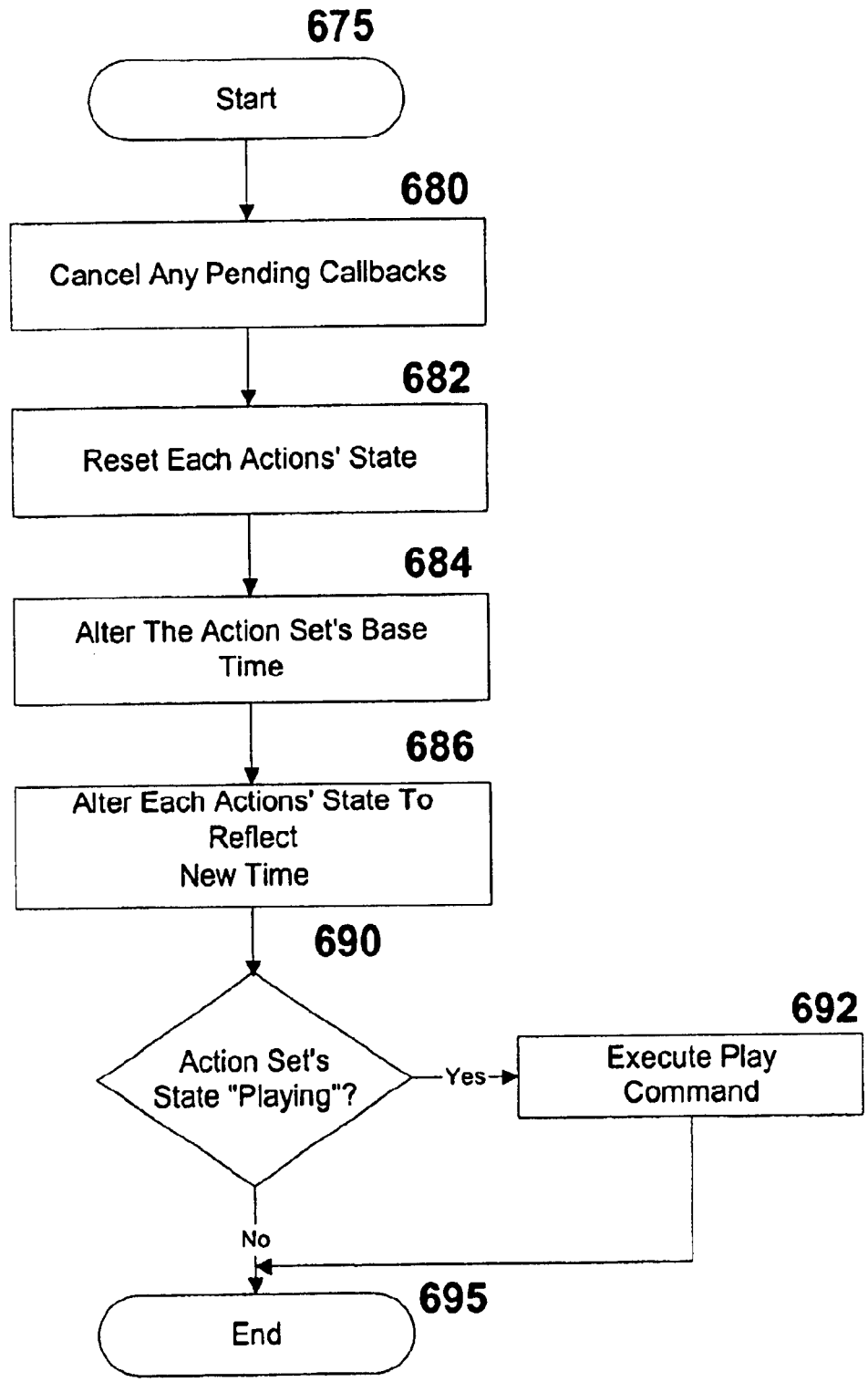
FIG. 6D is a high-level flow diagram of the sequencer control seek method.

Finally, FIG. 6D describes the steps performed in response to the seek sequencer command. The seek command changes the current execution time to another specified time, while ignoring the pending non-invoked events. After a seek command is received by the sequencer control object 530, any pending callbacks are canceled in step 680. Next, in step 682, the state of each action 550 of the action set 540 is reset. Then, in step 684, the base time of the action set 540 is altered to reflect the specified time invoked by the seek command. Next, in step 686, the state of each action 550 is altered to reflect the specified time. At which point, in step 690, the state of the action set 540 is evaluated to determine whether it was set to play when the seek command was received. If so, in step 692, the play command as illustrated by the steps of FIG. 6A is performed to resume playing of the timeline at the specified time.

Figure 7:
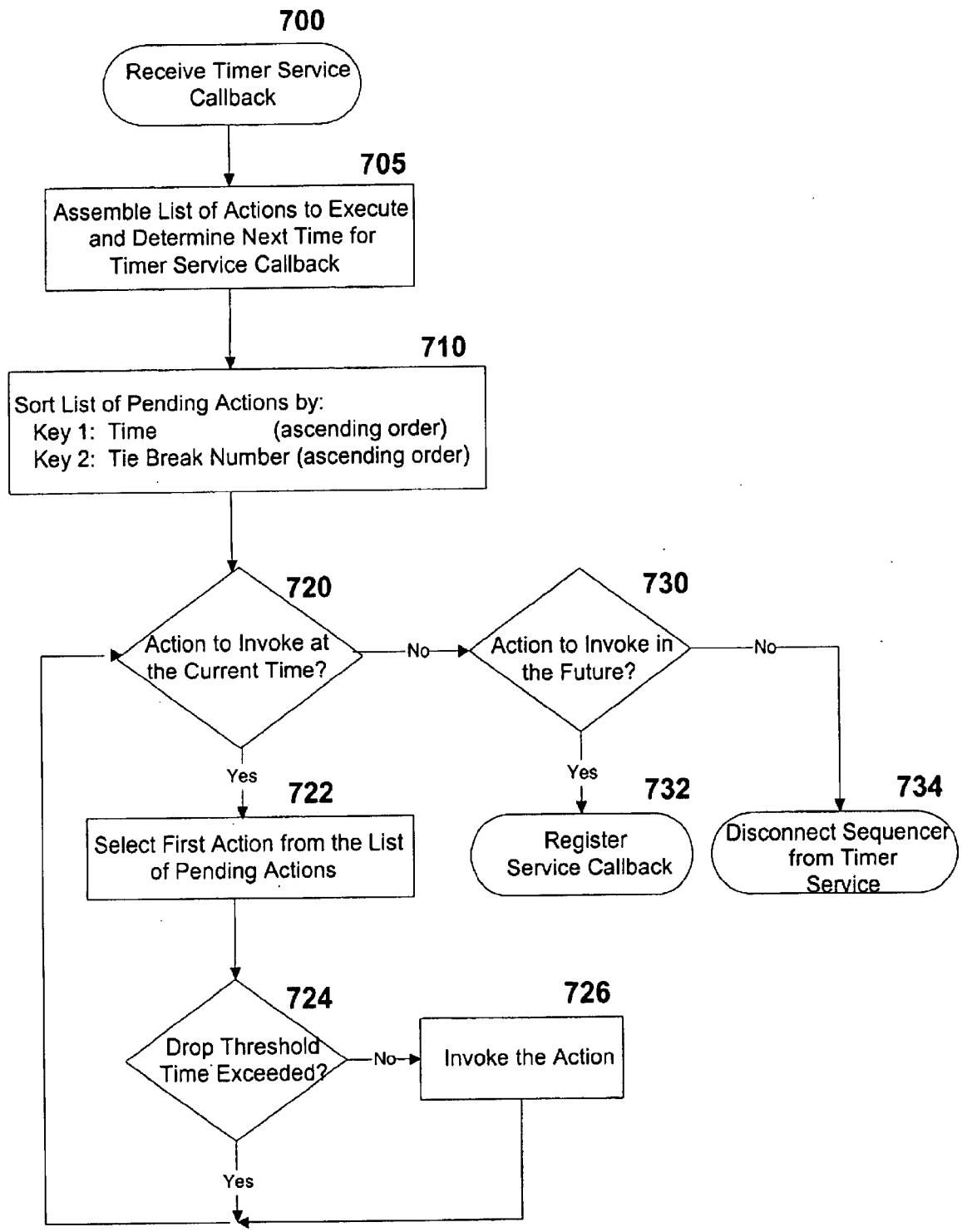
FIG. 7 is a high-level flow diagram for the sequencer control upon receiving a callback from the timing service.

Turning now to FIG. 7, illustrated is the performance of the action set 540 for invoking an event or events scheduled at a given instant of time. At step 700, the action set 540 receives a service call back from timer 560. At which point, in step 705, the action set 540 assembles a list of actions to be executed at that given instant of time, and for expediency, also determines the next time for the timer service call back. Then, in step 710, the list of actions to be invoked at the current instant is sorted by time and secondarily by the tie break number in step 710. In decision 720 the current time is compared to the first item in the pending actions list to verify that an action is pending to be invoked. If there is such an action, in step 722, the first action to be invoked is selected from the list and then, in step 724, the events drop threshold is analyzed to see whether or not it has been exceeded. If it has not, the action is invoked as indicated in step 726. At which point, in reference to FIG. 5, the interface on the action 550 is invoked which in turn calls the host script engine 510 to actually execute the event. If in step 720 there are not actions to invoke at the current time, then in step 730 the action queue is reviewed to determine whether there are more actions to invoke in the future. If there are, in step 732 the next service call back is registered with timer 560. Else, in step 734, the timer 560 is disconnected as there are no more events to invoke.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A computer-implemented method for executing a plurality of events, the method comprising:

reading one or more event-timing statements in a mark-up language document, the event-timing statements being in a user-viewable format and each specifying an execution time for one of the plurality of events, wherein each of the execution times is expressed according to its position along a single timeline common to the plurality of events; and, executing each of the plurality of events at its execution time as designated in the one or more mark-up language statements.

2. The method of claim 1, wherein the one or more event-timing statements further designate the number of times at least one event of the plurality is to be re-executed and the interval between reexecutions, the method further comprising:

(a) waiting for the designated interval;
(b) reexecuting the event; and,
(c) repeating steps (a) and (b) for the designated number of times.

3. The method of claim 1, wherein the one or more event-timing statements further designate a tie breaker value, the method further comprising:

if two or more events have the same designated time, ordering their execution according to their designated tie breaker values.

4. The method of claim 1, wherein the one or more event-timing statements further designate a threshold period for determining how long a representation of at least one of the events is to remain in an execution queue before it is removed.

5. A computer-readable medium having stored thereon;

a mark-up language document comprising a plurality of event-timing statements for executing a plurality of events, wherein each event-timing statement being in a user-viewable format comprises an execution time for an associated event of the plurality of events, wherein each execution time is expressed in terms of its position along a common timeline by which the execution of the plurality of events are synchronized.

6. The computer-readable medium of claim 5, wherein at least one of the plurality of event timing statements further comprises a loop count representing the number of times an event of the plurality of events is to be reexecuted and an interval value representing the time between reexecutions.

7. The computer-readable medium of claim 5, wherein at least one of the plurality of event timing statements further comprises a tie breaker value for determining the order of execution of two or more events if the two or more events are designated to execute at the same time.

8. The computer-readable medium of claim 5, wherein at least one of the plurality of event timing statements further designates a threshold period for determining how long a representation at least one of the plurality of events is to remain a queue before it is removed.

9. In a computer system, a method for controlling the execution of a plurality of multimedia events, the method comprising:

generating a timeline to provide a common time reference from which the plurality of multimedia events may be scheduled;

reading an HTML document having a plurality of event-timing script statements identifying the plurality of multimedia events and respective scheduled execution times on the timeline;

starting the execution of the timeline;

determining which of the plurality of multimedia events is currently scheduled to be executed on the timeline; and executing the currently scheduled multimedia event.

10. The method of claim 9, wherein each a multimedia event has a priority value associated therewith, the method further comprising:

determining whether two or more of the plurality of multimedia events are scheduled to be executed at the same time; and, executing whichever multimedia event has the highest priority value.

11. The method of claim 9, wherein a multimedia event of the plurality has a drop threshold window, and the step of executing the multimedia event is performed only if the drop threshold window has not been exceeded.

12. The method of claim 9, further comprising:

for each of multimedia event of the plurality of multimedia events, placing an entry into a queue corresponding to the multimedia event;

initializing a timeline value representing the initial position along the timeline; and incrementing the timeline value commensurate with an amount of elapsed time since starting the execution of the timeline.

13. The method of claim 12, wherein the step of starting the execution of the timeline is performed after the entries have been placed in the queue.

14. The method of claim 12, further comprising:

pausing the execution of the timeline; and
restarting the execution of the timeline.

15. The method of claim 9, further comprising the steps of pausing the execution of the timeline; and restarting the execution of the timeline.

16. The method of claim 9, further comprising the steps of stopping the execution of the timeline in response to a script defined within the mark-up language document.

17. The method of claim 9, wherein the scheduled time on the timeline for each event is relative to a start reference time, and the start reference time is determined by the execution of a script.

18. The method of claim 17, wherein the script is a play script, or an on-timeline-loaded script executed automatically upon completion of loading the timeline.

19. The method of claim 9, wherein the currently scheduled multimedia event has a repeat value associated with it, the method further comprising scheduling a second invoking of the currently scheduled multimedia event according to the repeat value.

20. The method of claim 19, wherein the repeat value comprises a loop count and a repeat interval.

21. In a computer system, a sequencer framework for synchronously invoking a set of events scheduled on a timeline associated with the set of events, wherein the timeline provides a common time reference from which each event in the set of events may be scheduled, the sequencer framework comprising:

a plurality of action objects, each action object referenced to an event from the set of events;

an action set object for processing the plurality of action objects for invoking the set of events; and a timer object for receiving a notification from the action set object specifying an earliest invoking time and sending a call-back to the action set object at the earliest invoking time, wherein the action set object causes the invoking of one of the referenced events associated with said earliest invoking time upon receiving the call-back from the timer object.

22. The sequencer framework of claim 21, further comprising a host script engine, wherein the action set object causes the invoking of one of the referenced events by invoking a method of an action object which references the event, the event then being executed on the host script engine.

23. The sequencer framework of claim 21, further comprising a sequencer manager object for controlling multiple sets of events according to multiple timelines.

24. The sequencer of claim 21, wherein the action set object further comprises an arbitration mechanism for determining the invoking order for two events within the set of events when both events are scheduled to be invoked at the same time.

25. The sequencer of claim 24, wherein the arbitration mechanism includes comparing a tie break value corresponding to each event scheduled to be invoked at the same time.

26. The sequencer of claim 24, wherein the action set object further comprises a drop threshold mechanism for determining whether a drop threshold window associated with the one of the referenced events has been exceeded; and wherein the action set object does not cause the invoking of the one of the referenced events if its associated drop threshold window has been exceeded.

27. In a computer system, a method for synchronizing a plurality of events scheduled on a timeline having a start time, wherein the timeline provides a common time reference from which each of the set of events may be scheduled, the method comprising the steps of:

defining a plurality of events, including:

specifying for each event of the plurality of events an operation to perform and an invoking time relative to the start time, and specifying for each event of at least a subset of the plurality of events an invoking priority value and an invoking window;

controlling the execution of the timeline, including: setting a current timeline position to the start time, incrementing the current timeline position based on elapsed time since receiving a command to proceed with execution of the timeline; and invoking the plurality of events at appropriate times, including: determining a next invoking time corresponding to the earliest scheduled invoking time after the current timeline position among the plurality of events, registering with a timer control the next invoking time receiving notification from the timer control that the next invoking time has arrived, collecting a set of current events from the plurality of events whose scheduled invoking time is at or before the current timeline position and at or after the next invoking time, deriving an invoking queue for the current events within the set of current events by sorting by their respective invoking priority values, removing a first queue event from the front of the invoking queue, and performing the operation associated with the first queue event if the current timeline position has not exceeded the invoking window for the first queue event.

28. A computer-readable medium having computer-executable instructions for performing the steps recited in claim 27.

29. The method of claim 27, wherein the events are multimedia events.

30. The method of claim 27, wherein the events are defined in statements in a user-viewable format within a Web page document.

31. The method of claim 27, wherein the step of defining a plurality of events further includes specifying for one event of the plurality of events a repeat value defining a set of multiple invoking times for the one event.

32. The method of claim 31, wherein the step of defining a plurality of events further includes specifying for the one event a time interval.

33. A computer-readable medium having computer-executable instructions for performing the steps recited in claim 31.

34. The method of claim 27, wherein the current timeline position does not begin incrementing until the plurality of events have been defined or until a play command has been executed.

35. The method of claim 27, wherein the step of controlling the execution of the timeline, further includes stopping the incrementing of the current timeline position in response to a pause or stop command.

36. The method of claim 27, wherein the timer control ceases its notification service in response to a stop command.

37. The method of claim 27, wherein the current timeline position is incremented to a value corresponding to the value specified in a seek command.

* * * * *